Sept. 6, 1927.
P. HAAS
1,641,756
INLET VALVE MECHANISM
Filed April 16, 1927
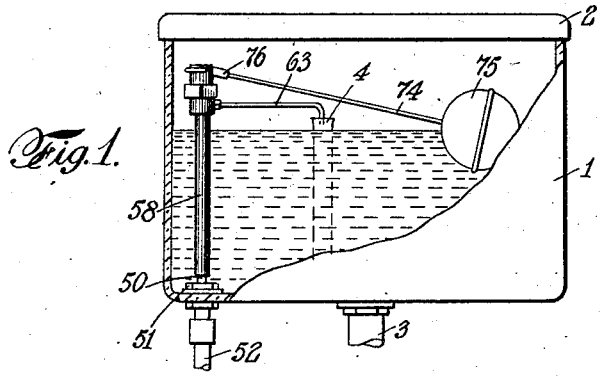
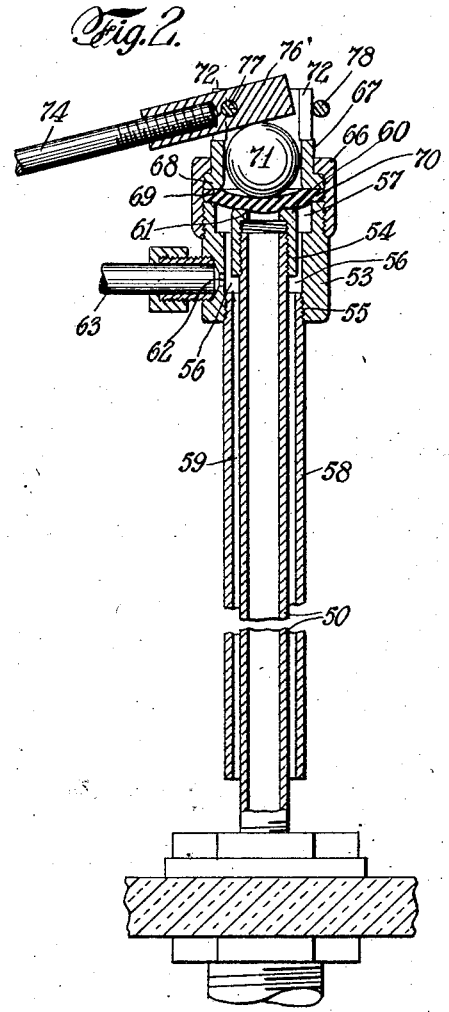
Philip Haas INVENTOR
BY Louis Prevost Whitaker ATTORNEY Patented Sept. 6, 1927.

1,641,756

UNITED STATES PATENT OFFICE.

PHILIP HAAS, OF DAYTON, OHIO.

INLET-VALVE MECHANISM.

Application filed April 16, 1927. Serial No. 184,225.

My invention consists in the novel features hereinafter described, reference being had to the accompanying drawing which shows one embodiment of the invention selected by me for purposes of illustration, and the said invention is fully disclosed in the following description and claims.

The object of my invention is to provide an inlet valve mechanism for flushing tanks adapted to be controlled by a float and float lever, of extreme simplicity, which can be very cheaply manufactured and which is extremely unlikely to get out of order or fail to operate, and in which the only portion at all likely to require replacement may be quickly and readily replaced by the ordinary householder without the assistance of skilled labor, the said inlet valve mechanism being also adapted to be readily installed in any ordinary flush tank now in use, as well as in tanks in which it is a part of the original equipment.

Referring to the drawing,

Fig. 1 represents a front view of a flush tank partly broken away and showing my improved inlet valve mechanism installed therein in connection with the usual float and float lever.

Fig. 2 is an enlarged sectional view of the inlet valve mechanism and adjacent parts including the inlet and discharge pipe connected therewith.

Fig. 3 is a whole sectional view of the lower valve casing member detached.

Fig. 4 is a perspective view of the upper casing member detached, a portion of the valve actuating lever and the pivot pin therefor being illustrated in dotted lines.

Fig. 5 is a view similar to Fig. 3 of the lower casing member, showing a slight modification in which the valve seat is formed at the upper end of the inlet pipe.

In the accompanying drawing, 1 represents a flush tank which may be of any usual or preferred construction. As shown it is made of porcelain and provided with a removable cover, 2, but the particular construction of the tank is immaterial. The tank is shown provided with a discharge or flushing pipe, 3, controlled by any usual or preferred type of flushing valve mechanism, which is not itself herein shown or described as it forms no part of my present invention. The usual overflow pipe is indicated at 4 in Fig. 1. In the form of my invention herein shown, 50 represents a vertically disposed inlet pipe extending upwardly from and supported by a fitting, 51, secured to the bottom of the tank in an aperture therein, and connected with a water supply pipe, 52, in any usual or desired manner. The fitting is provided with a threaded aperture communicating with the water pipe into which the lower end of the inlet pipe, 50, is screwed, so as to maintain said pipe in a vertical position. The upper end of the inlet pipe preferably extends above the water level in the tank, as indicated in Fig. 1, and supports the inlet valve, the casing of which comprises a lower member and an upper member united preferably by a follower in a manner similar to a pipe union. The lower member, 53, of the valve casing is provided with a vertically disposed centrally located bore or passage indicated at 54, which may be formed in the casing member itself (not shown) or in a separate block secured therein, the lower portion of said passage being screw threaded interiorly to receive and fit the threaded upper end of the inlet pipe, 50. The lower casing member is also provided at its lower end with a threaded aperture indicated at 55, and with a vertical passage or passages indicated at 56, disposed laterally with respect to the central bore, and communicating with an annular recess, 57, in the upper part of said member surrounding said central bore. The water discharge pipe, 58, surrounds the inlet pipe and has its upper end threaded and screwed into the threaded aperture, 55, so as to support the discharge pipe co-axially with the inlet pipe, and the discharge pipe extends to a point adjacent to the bottom of the tank, the annular passage between the two pipes indicated at 59 forming an unobstructed discharge passage for the water into the tank when the valve hereinafter described is in open position. The lower casing member is provided with a valve seat communicating with the inlet pipe and located within the recess, 57. This valve seat may be formed by the walls of the central bore as indicated at 60 in Fig. 2, and is preferably provided with a curved or downwardly extending face, 61, at the inner edge of the valve seat, as shown in Fig. 2. In some instances I may thread the interior of the central bore throughout its length and screw the inlet pipe entirely through the same and form the valve seat on the upper end of the inlet pipe, as indicated at 160 in Fig. 5, which shows a slightly modified form of the lower member in which the corresponding portions are given the same reference numerals as those used in Fig. 2 with the addition of 100. In this instance the valve seat, 160, will likewise be provided with the inwardly curved or sloping edge portion, 161, which will be formed on the upper end of the inlet pipe itself. This feature of having the inlet pipe extend through the central bore of the lower member and provided with a valve seat at its upper end, is advantageous in that it permits of the vertical adjustment of the valve seat with respect to the lower casing member, but this construction is not claimed specifically herein. The lower casing member is preferably but not necessarily provided with a lateral aperture indicated at 62 in Fig. 2, in communication with one of the laterally disposed vertical passages, 56, for the attachment of an after-fill pipe indicated at 63, the outer end of which is arranged to discharge within the overflow pipe in a well known manner. The lower casing member is also provided at its upper end with an annular clamping edge or face indicated at 64, and with exterior threaded portions indicated at 65, to receive a follower indicated at 66. The upper casing member consists of a sleeve, 67, having a large central bore, the lower end of the sleeve being provided with an annular flange, 68, to engage the inwardly extending flange of the follower and an annular clamping edge or face, 69, at the bottom of said flange.

The inlet valve itself comprises a flexible disc, 70, circular in form, and which may be cut out of a sheet of rubber, rubber reinforced by fabric, leather or other suitable material. The edges of this disc valve are clamped between clamping faces of the upper and lower casing members when the follower, 66, is screwed home, as clearly shown in Fig. 2, and the valve will extend above the valve seat which is located adjacent to the underside of the valve, so that when the valve is pressed downward upon the seat the passage of water from the inlet pipe is prevented. In the interior of the sleeve or upper casing member, 67, is located, a ball or spherical member, 71, formed of a non-corrodible material such as glass or porcelain, or a non-corrodible metal. For cheapness, I prefer to employ an ordinary glass marble, as it can be readily replaced by the householder should it become injured or lost in effecting a repair or replacement of the disc valve. The ball member, 71, is of such size that it can move freely vertically within the sleeve or upper member, 67, and the lower portion of the ball member will engage the central portion of the disc valve, 70, and when subjected to pressure will depress the central portion upon the seat and close the valve. The interior rounded edges of the valve seat indicated at 61 in Fig. 2 (and 161 in Fig. 5), enables the central portion of the valve to fit tightly on the seat without cutting or injuring the valve, which will therefore last for a very long time as it is only subjected to water on the lower side, and prevents the passage of any water above it.

The upper portion of the upper casing member or sleeve, 67, is provided with oppositely disposed recesses indicated at 72, and oppositely disposed apertures indicated at 73, to receive a pivot pin, 77, which also passes through a portion of or connected with the float lever, 74, carrying the usual float, 75. In this instance I have shown the float lever provided at its inner end with a sleeve extension, 76, having a threaded recess into which the lever, 74, is screwed, and a transverse aperture to engage the pivot pin 77. The pin, 77, may be held against accidental displacement in any desired way, for example by providing it with a curved locking portion, 78, as indicated in dotted lines in Fig. 4. The inner end of the sleeve extension, 76, operatively engages the upper portion of the ball, 71, as clearly shown in Fig. 2, and as the float rises in the tank the ball, 71, will be depressed and close the valve. With the lowering of the water in the tank by a flushing operation, the float will descend releasing the ball, 71, and permitting the valve, 70, to be raised above its seat by the pressure of the water in the inlet pipe, so that the water will overflow the valve seat, down through the laterally arranged passage or passages, 56, and will be discharged through the annular passage, 59, between the inlet pipe and the discharge pipe, near the bottom of the tank. As the tank fills and lifts the float, the ball, 71, will be depressed and will again close the disc valve upon its seat.

It will be seen that my improved inlet valve mechanism is extremely simple in construction and can be very cheaply made. By forming the upper casing member as a sleeve of large internal diameter, and placing therein a valve actuating member in the form of a ball of glass or other vitreous material, or of uncorrodible metal, the cylindrical portions of the sleeve guide the ball in its vertical movements and there is no possibility of the ball sticking or wedging in the interior of the sleeve, or of being retarded in its vertical movements, as its contact with the sleeve is almost infinitesimal. There is also no danger or any wear of the ball in the sleeve which could ever affect the proper operation of the valve. There is, therefore, practically nothing about the valve mechanism to get out of order except the valve itself, which any householder can remove from between the casing members by simply unscrewing the follower, and which can be replaced by a circular piece of leather, rubber, or rubber fabric which the householder may happen to have at hand, without the delay and expense incidental to the employment of skilled labor.

What I claim and desire to secure by Letters Patent is:—

1. In an inlet valve mechanism for flush tanks, the combination with the valve casing provided with a water inlet and outlet and an annular valve seat, of a flexible disc valve extending across said valve seat, a spherical vertically movable valve actuating member engaging the central portion of the disc valve, and a float lever pivoted to said casing and having a portion for engaging said spherical valve actuating member.

2. In an inlet valve mechanism for flush tanks, the combination with the valve casing provided with a water inlet and outlet and an annular valve seat, of a flexible disc valve extending across said valve seat, a spherical vertically movable valve actuating member of non-corrodible material, said casing being provided with a cylindrical portion above the valve seat for guiding said spherical member in its vertical movements, and a float lever pivotally connected with said casing, and having a portion for engaging said spherical member in a direction to seat the valve.

3. In an inlet valve mechanism for flush tanks, the combination with the valve casing provided with a water inlet and outlet and an annular valve seat, of a flexible disc valve extending across said valve seat, a spherical vertically movable valve actuating member of vitreous material, said casing being provided with a sleeve portion above the valve for guiding said spherical member and a float lever pivotally secured to said sleeve portion of the casing, and having a part extending into said sleeve portion for engaging said spherical member in a direction to seat the valve.

4. Inlet valve mechanism for flush tanks including an inlet valve casing formed of an upper and a lower member, said lower member being provided with a central cylindrical bore internally threaded for the reception of a vertical inlet pipe, and having a discharge aperture at its lower end of greater diameter than said central bore, internally threaded to receive a discharge pipe surrounding the inlet pipe, said lower casing member being provided with a valve seat in communication with the inlet pipe, and with laterally arranged vertical passages communicating with said discharge aperture, the upper portion of the casing member being in the form of a hollow vertical sleeve, a disc valve having its marginal portions extending between annular clamping faces of the casing members and its central portion extending across said valve seat, means for clamping said casing members together upon the disc valve, a float lever having a portion pivotally connected with the upper casing member and extending into the interior thereof, and a vertically movable spherical valve engaging member located within the upper casing member and interposed between said disc valve and the said inwardly extending portion of the float lever.

In testimony whereof I affix my signature.

PHILIP HAAS.